UNITED STATES PATENT OFFICE.

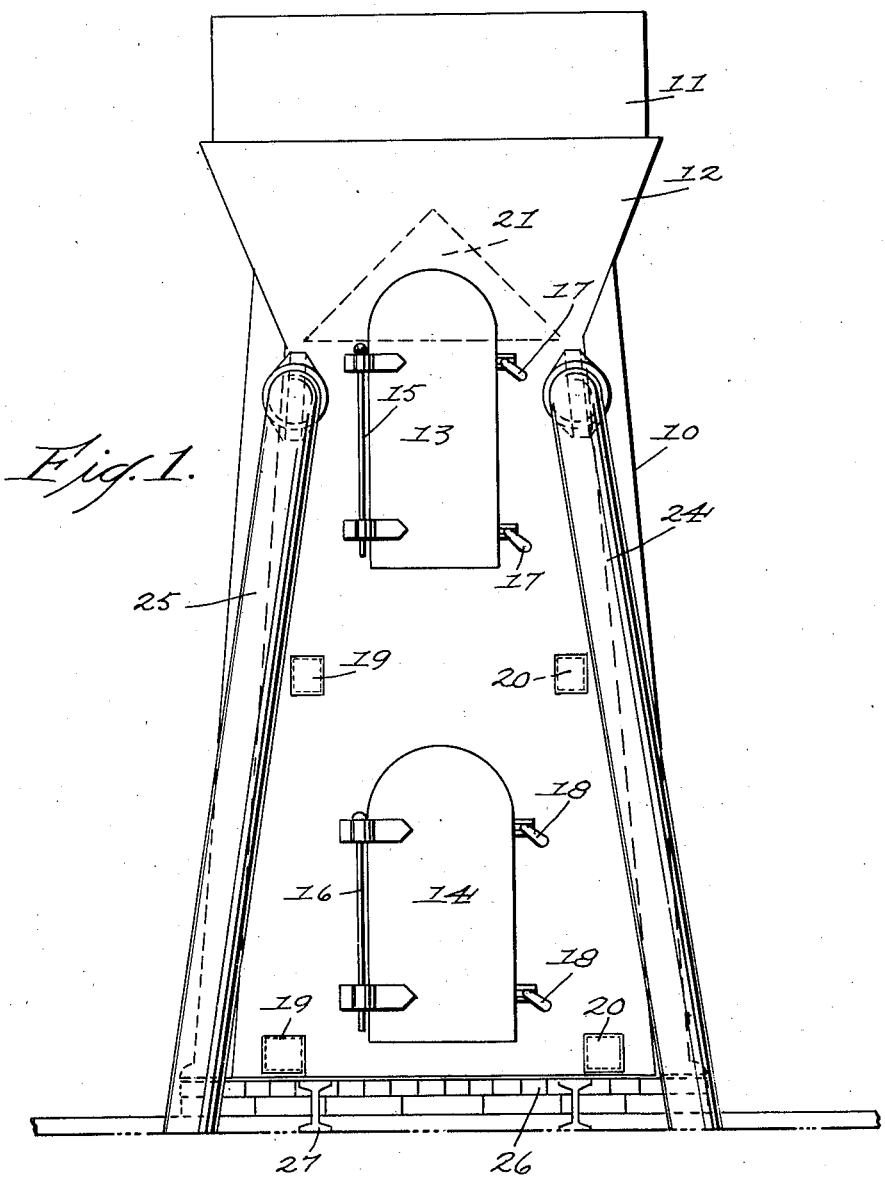

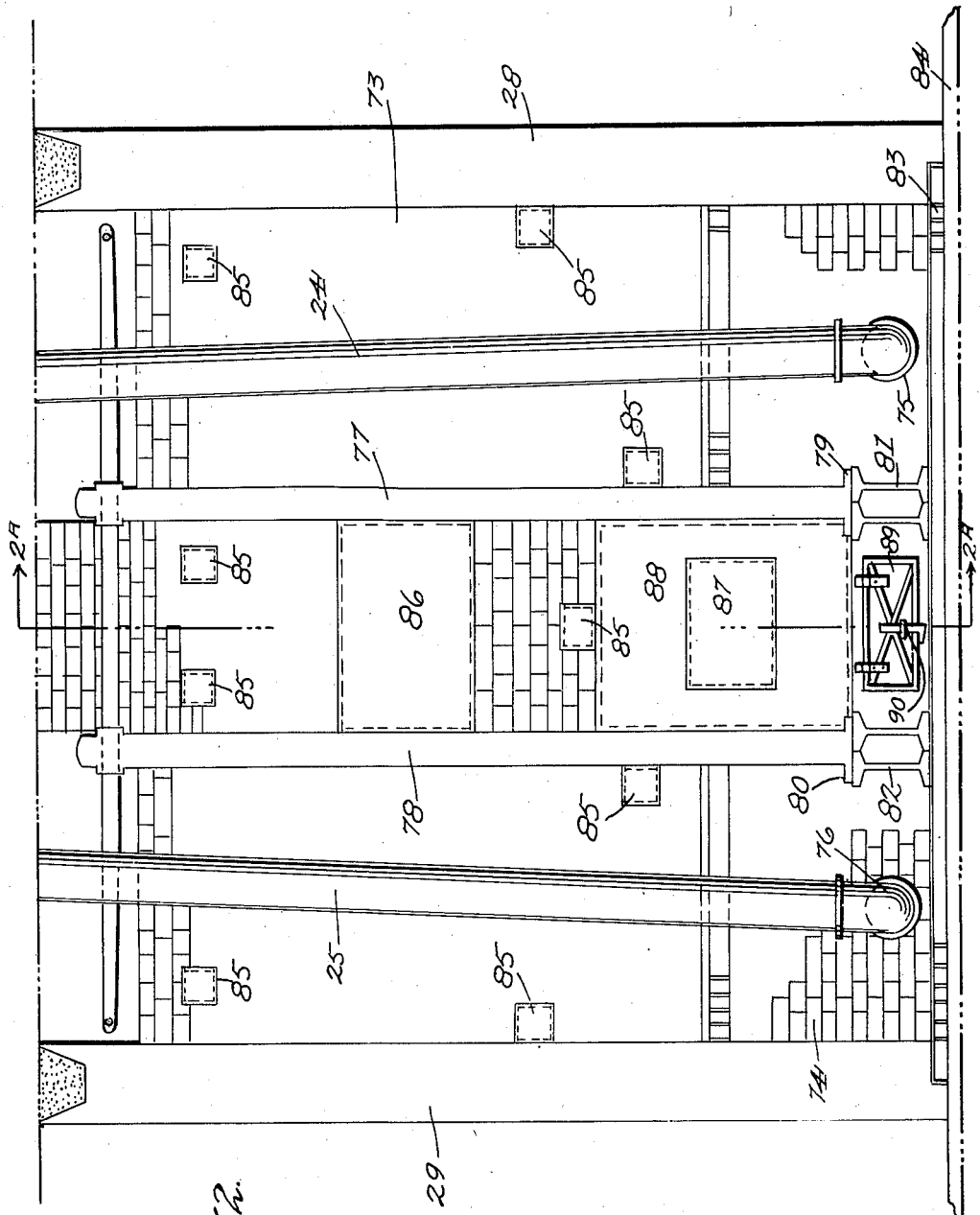

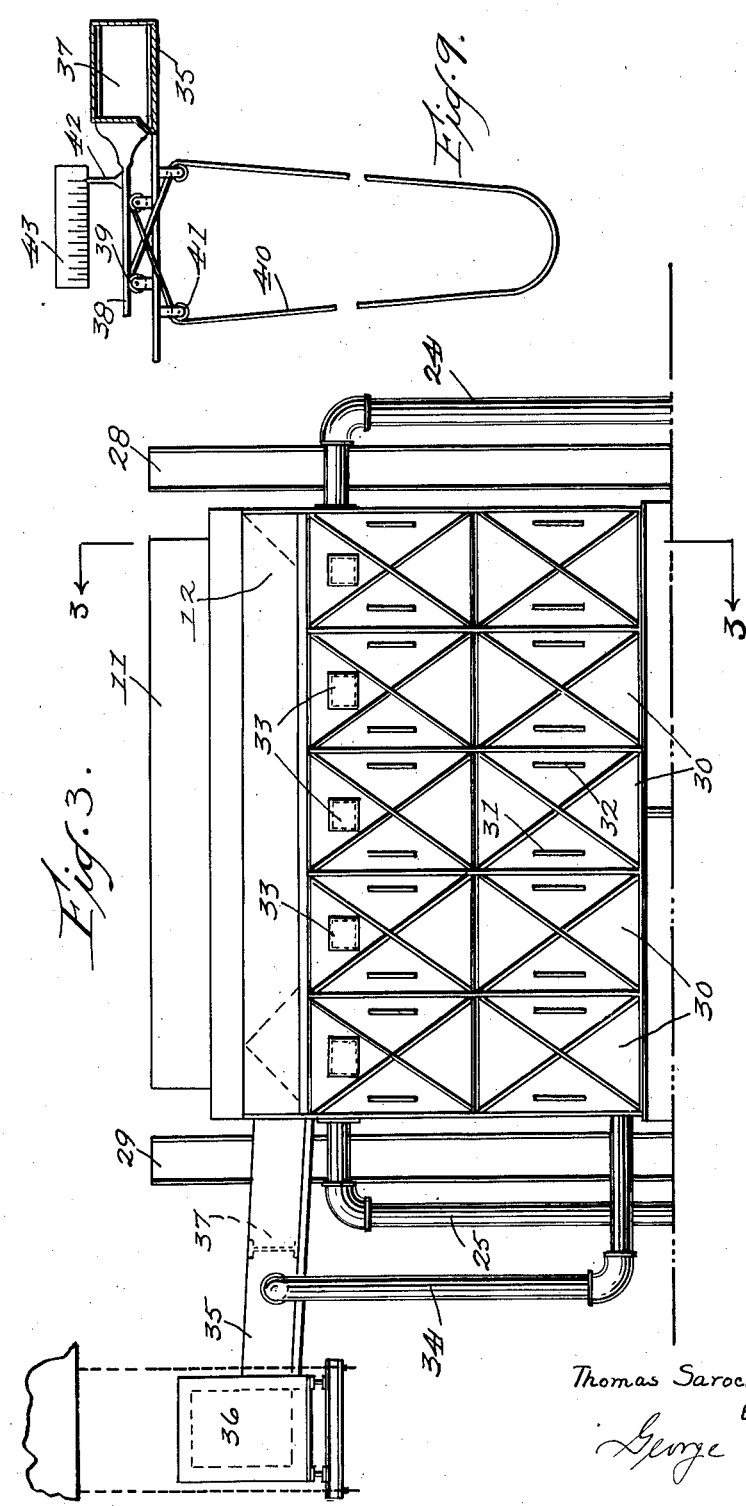

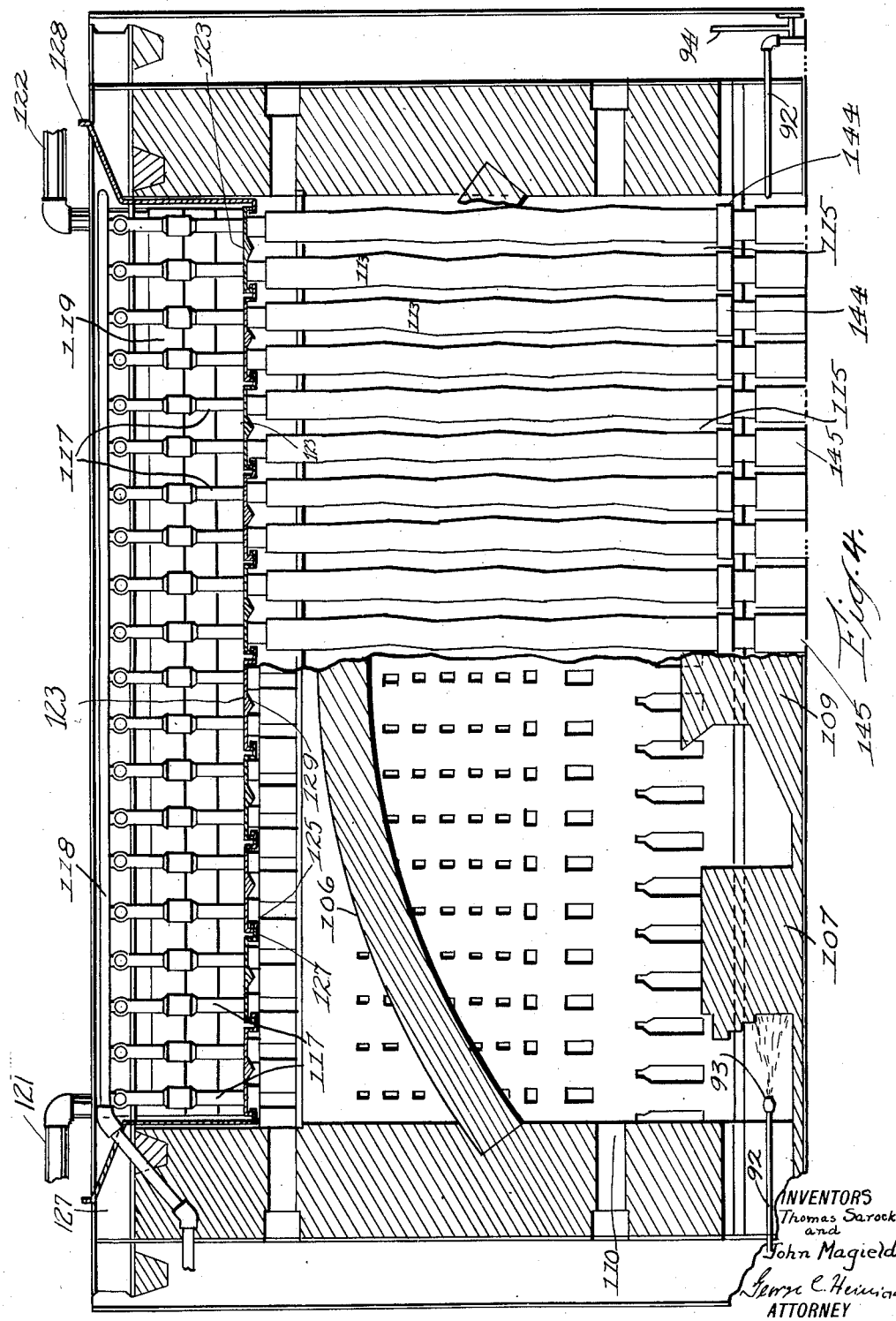

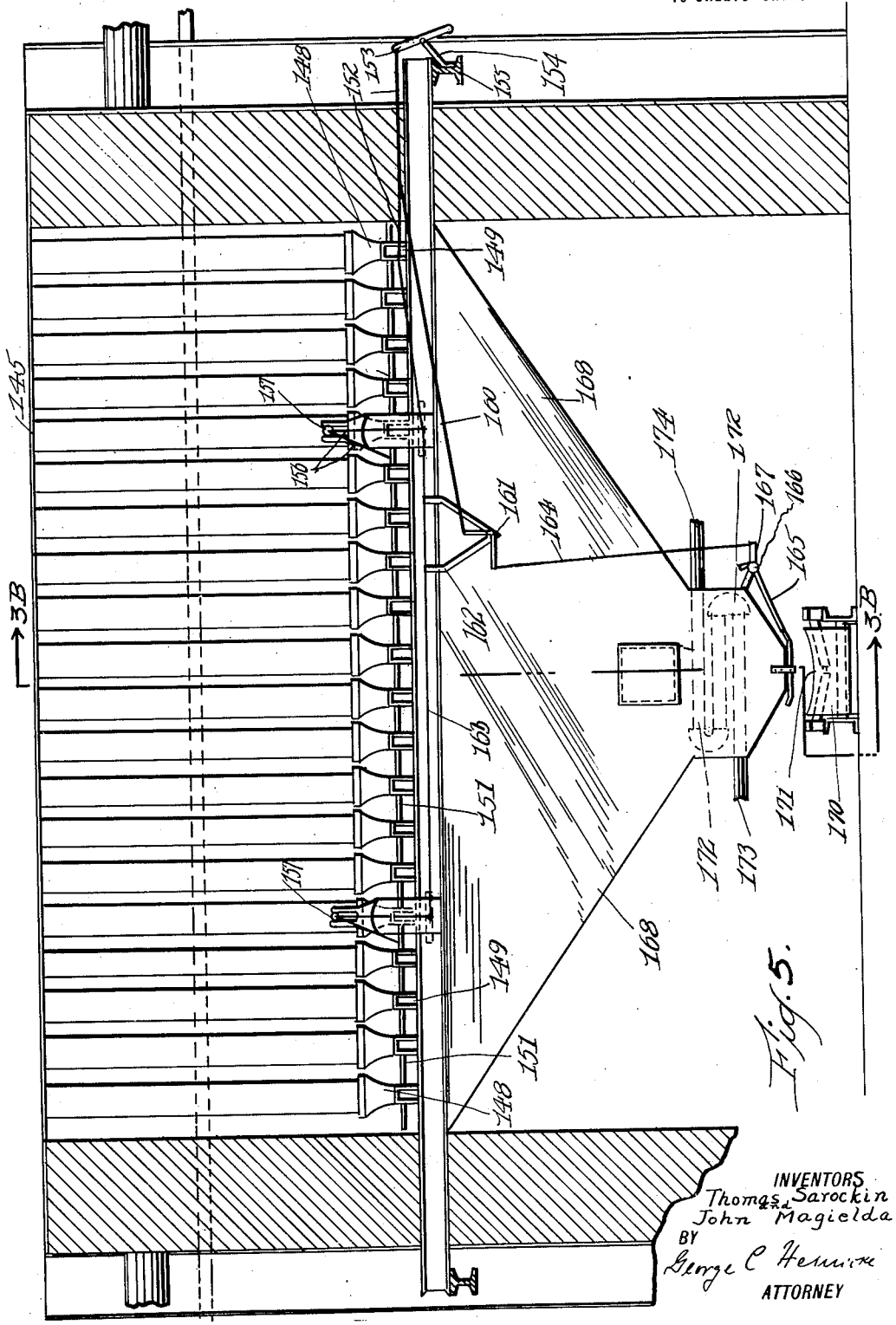

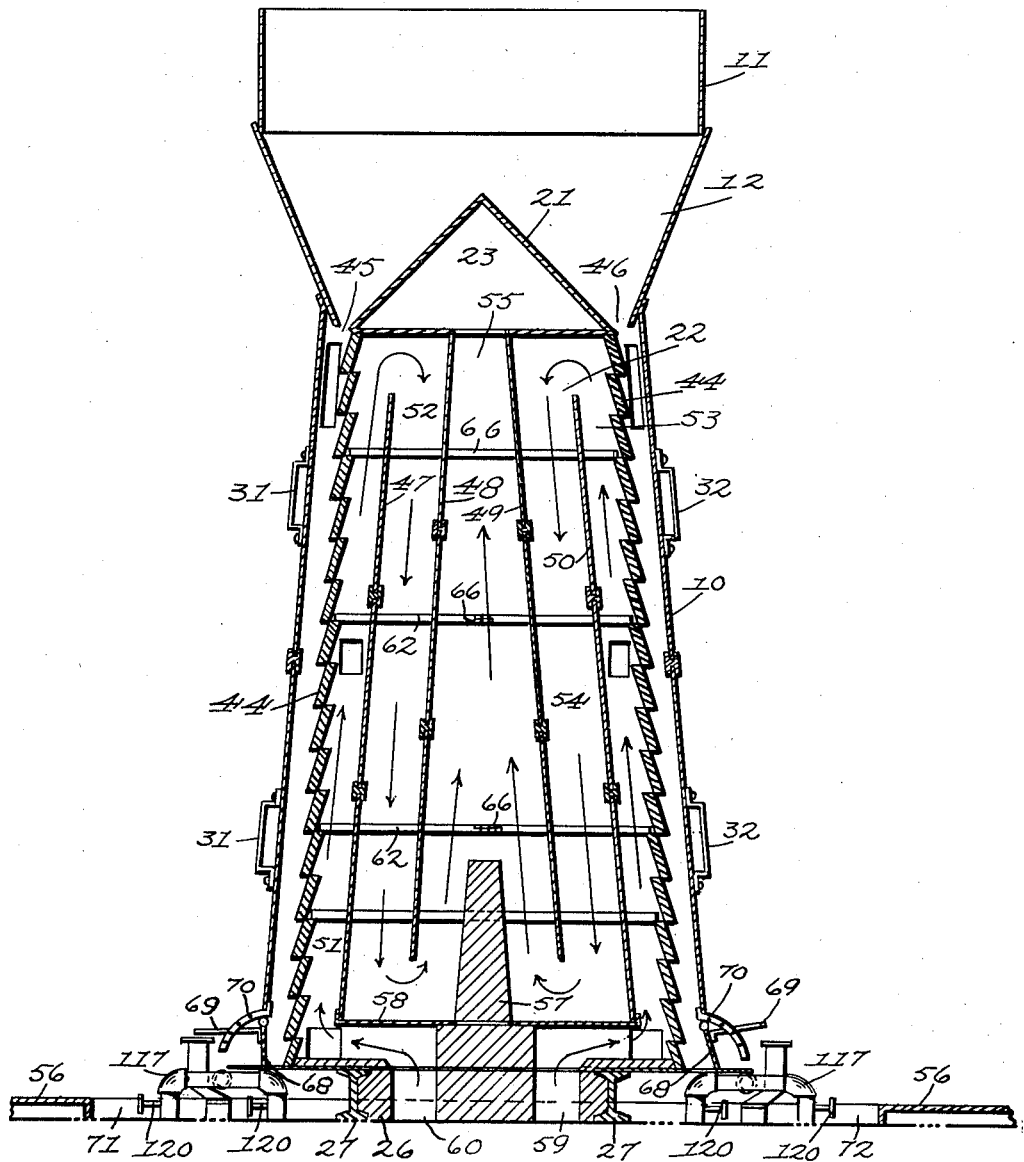

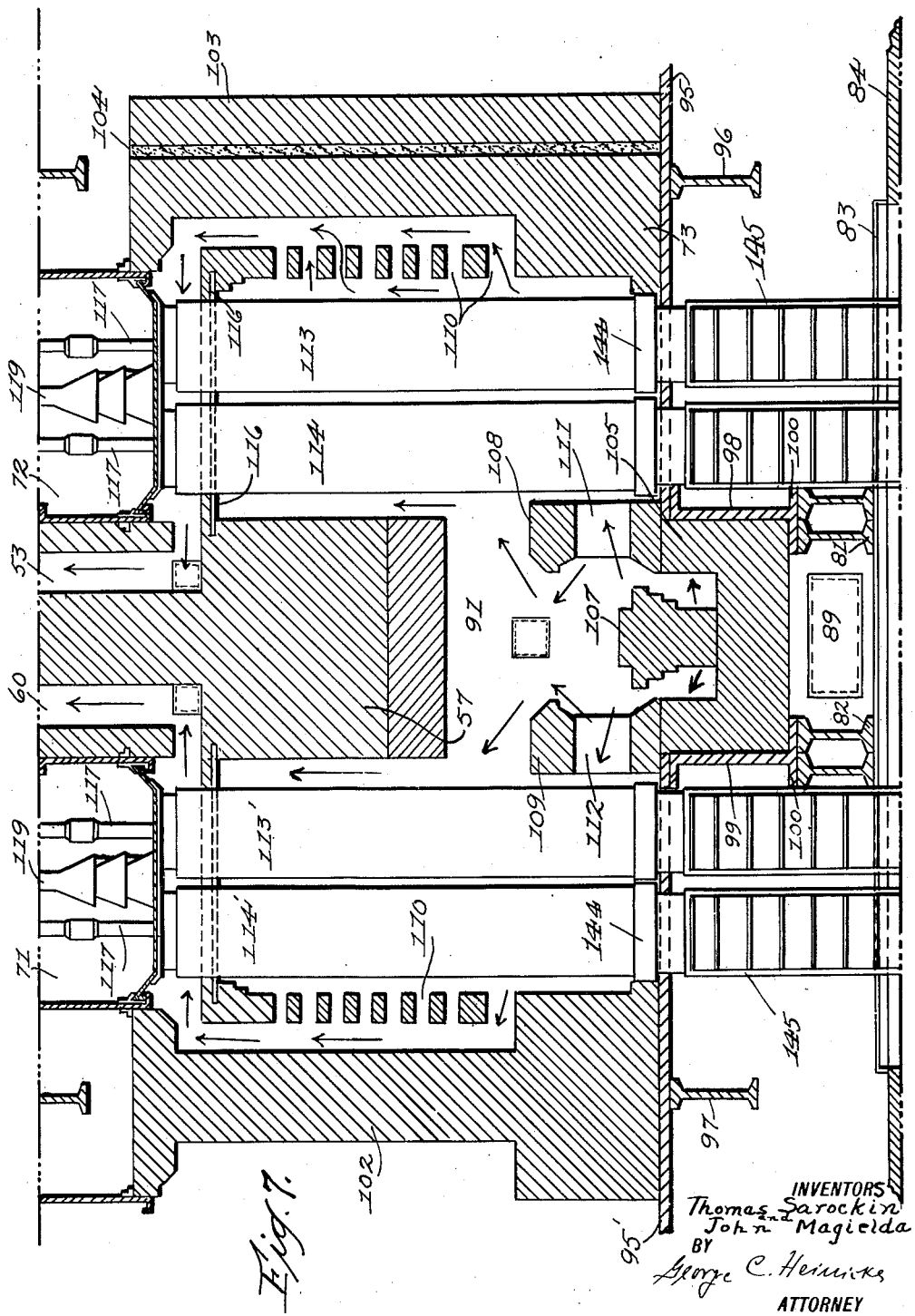

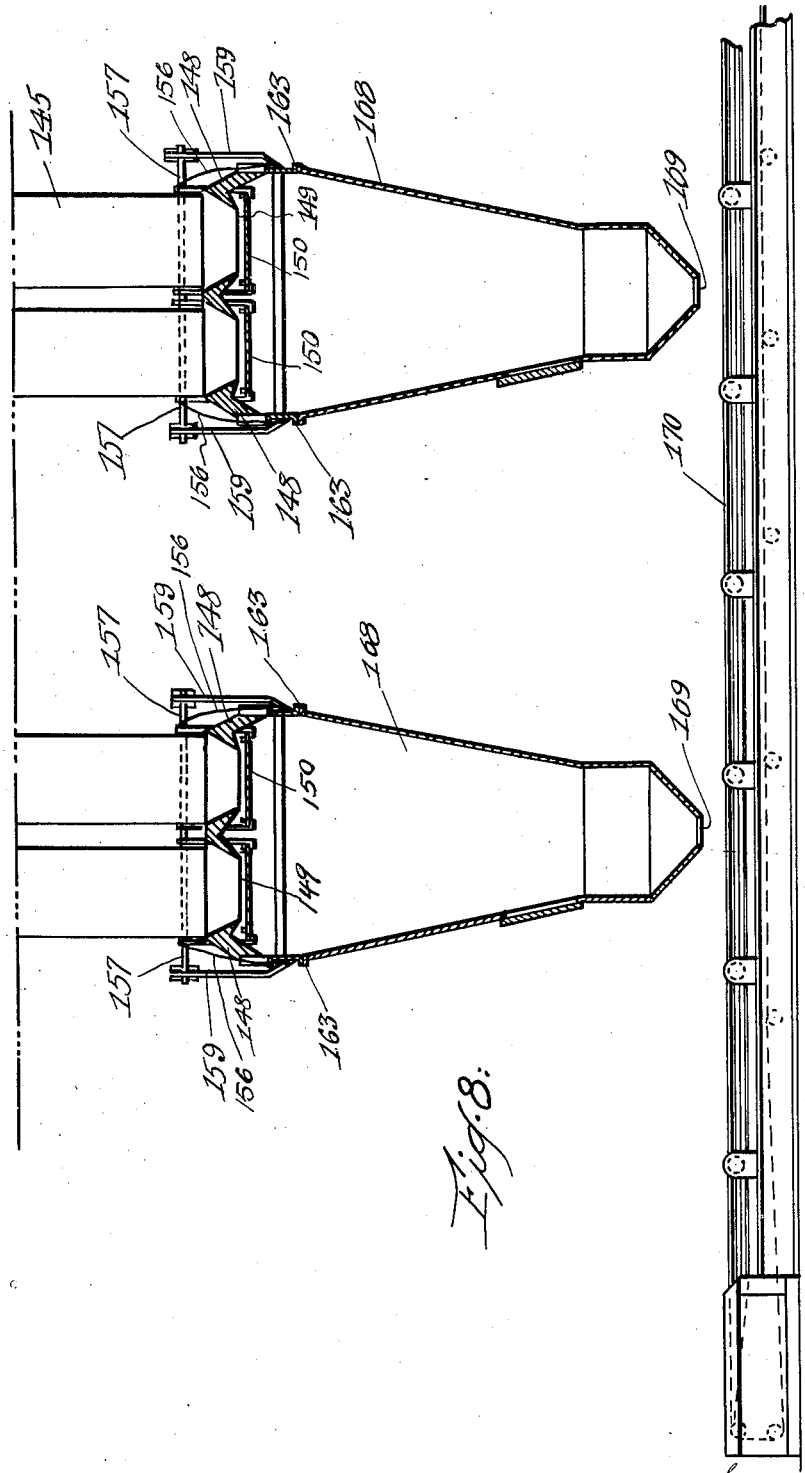

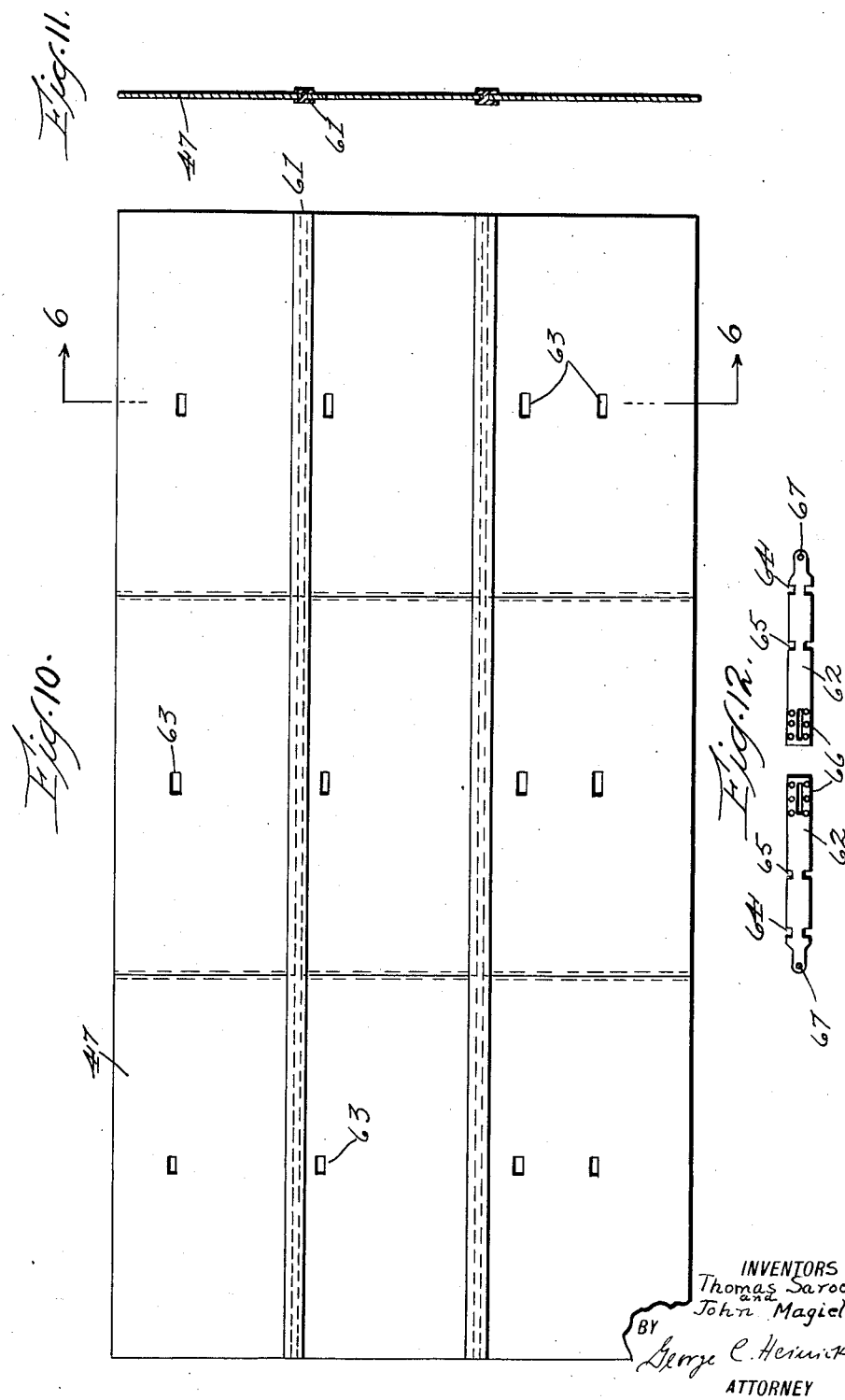

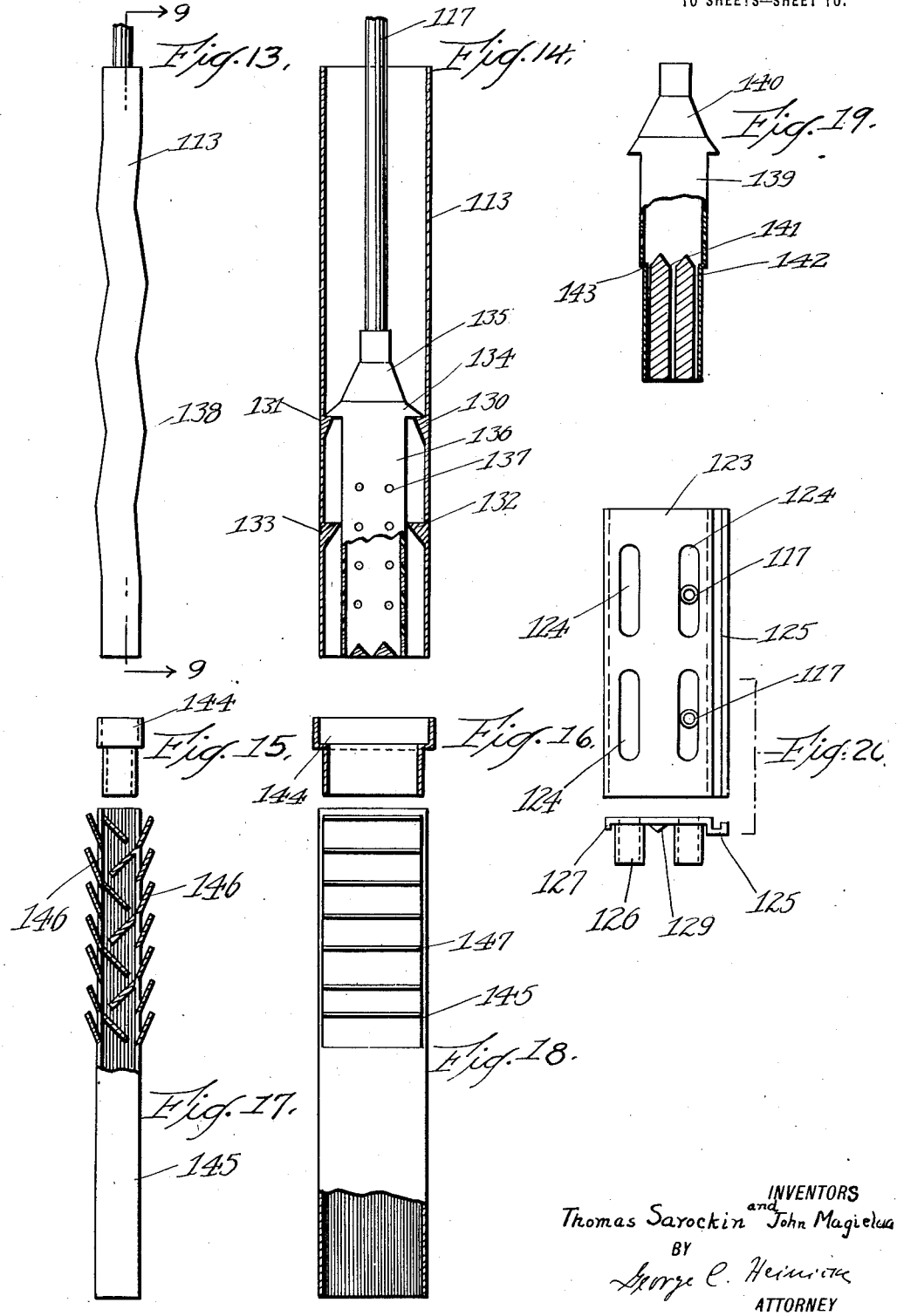

THOMAS SAROCKIN AND JOHN MAGIELDA, OF CROCKETT, CALIFORNIA.

CHARCOAL DRIER AND CLEANER.

1,392,225.  Specification of Letters Patent.  Patented Sept. 27, 1921.

Application filed May 3, 1920. Serial No. 378,617.

*To all whom it may concern:*

Be it known that I, THOMAS SAROCKIN, a citizen of Russia, residing at Crockett, county of Contra Costa, and State of California, and I, JOHN MAGIELDA, a citizen of Poland, residing at Crockett, county of Contra Costa, and State of California, have invented certain new and useful Improvements in Charcoal Driers and Cleaners, of which the following is a specification.

This invention relates to a combined charcoal drier, cooler and cleaner, more especially to that class of driers intended for the preparation of charcoal for use in the filtration of sugar.

The charcoal cooler and drier in the heretofore known type of kilns and driers has the disadvantage of being not thoroughly dried and therefore not sufficiently clean for use in the filtration of sugar so that it frequently happens that the sugar to be filtrated is damaged by such charcoal to the extent of being spoiled, resulting in the loss of considerable capital.

These disadvantages are overcome by the object of the present invention producing an absolutely dry, clean and pure charcoal.

With this end in view the principal object of the invention is to provide an apparatus of this character wherein the wet charcoal is gradually dried and freed of all impurities.

Another object of the invention is to provide a drier using oil as fuel and using it with the greatest economy.

This invention further relates to the means for gradually feeding the charcoal to be dried along the peculiarly constructed and heated inner walls of the third or top floor of a tower, and successively dropping the material by making use of suitable agitators into collection chambers on the second floor of the tower.

This invention further relates to the means for submitting the charcoal in these chambers to the simultaneous influence of hot and cold air and dropping it into suitably arranged retorts of novel construction acted upon by the fire gases.

A further object of the invention is the provision of closing plates for the bottoms of the chambers of novel construction through which the charcoal is fed into the retorts.

This invention also relates to the arrangement of air drums within each retort for the removal of all dust and impurities from the charcoal.

Furthermore this invention relates to the provision of exchangeable air drums allowing a quicker or slower feeding of the charcoal.

A further object of the invention is the provision of a damper regulation of novel construction permitting a regulation of the dampers to any degree which is made visible upon a suitable indicator.

A still further object of the invention is to provide a fire-box in connection with the apparatus which is of novel improved construction by the arrangement of a cornice work and suitable baffle walls.

This invention furthermore relates to the means of regulating and cooling the heated and dried charcoal coming from the retorts during its passage onto a suitable conveyer.

The devices or apparatus in present use for treating charcoal may have met the requirements sought to a certain degree, but not in a manner to warrant a commercial commodity of excellence and purity such as is produced through the instrumentality of this construction.

Finally, the invention consists in the novel construction and combination of the retort batteries and the appliances for heating the same, as hereinafter fully described, and set forth in the claims.

Other objects and advantages will become apparent as the description proceeds.

In the drawings similar characters of reference indicate corresponding parts in all the figures.

Figure 1 is a front elevation of the upper part or third floor of the tower used with our improved drier and cooler.

Fig. 2 is a front elevation of the second floor of the tower.

Fig. 3 is a side view of the upper part of the tower shown in Fig. 1, seen from the left side.

Fig. 4 is a section through the second floor of the tower, taken on line 2ᴬ—2ᴬ, of Fig. 2.

Fig. 5 is a section through the ground floor of the tower seen from the side.

Fig. 6 is a vertical section through the upper part of the tower shown in Fig. 1, the section being taken on line 3—3 of Fig. 3.

Fig. 7 is a front view of the second floor in section showing the inner arrangement.

Fig. 8 is a section through the ground floor of the tower, taken on line 3ᴮ—3ᴮ of Fig. 5.

Fig. 9 shows in detail a ventilator, partly in section with its scale and operating cable.

Fig. 10 shows in detail side view the partition plates shown in Fig. 6.

Fig. 11 is a sectional end view thereof the section being taken on line 6—6 of Fig. 10.

Fig. 12 is a detail top-plan view of two staples.

Fig. 13 is a side view of a retort shown in Fig. 14.

Fig. 14 is a vertical section taken on line 9—9 of Fig. 13.

Figs. 15, 16, 17 and 18 respectively show in detail views the air deflecting and cooling pipes and their respective heads.

Fig. 19 is a detail view, partly in section of a modified form of air drum shown in Fig. 14, and Fig. 20 shows in detail views a closing plate for the bottom of the chambers on top of Fig. 7 through which the air pipes pass.

As shown in Figs. 1 and 6 the top or third floor of the charcoal drier and cleaner tower 10 carries a basket 11 upon a hopper 12 for the reception and feeding of the wet charcoal to the drier.

Two doors, an upper door 13, and a lower door 14 hinged to the front wall of the tower, for instance as shown at 15 and 16 respectively, are provided with closures 17 and 18 respectively for hermetically closing the doors. These doors are only opened about once a year in order to clean the interior of the drier when the same is not in use.

Smaller doors 19 and 20 are provided somewhat below the big doors 13 and 14 respectively, and are intended to allow a frequent admission of a blast of air for cleaning and other purposes.

In order to facilitate the gradual feeding of the wet charcoal from the hopper 12 into the drier 10 a triangular body 21 is provided on top of the preliminary drying chamber 22, which body 21 constitutes at the same time a flue 23 which is in connection with the chimney through which the products of combustion and the exhaust gases escape.

As fuel preferably crude oil is employed, and the flames are guided into the preliminary drying chamber 22 through suitable channels in communication with the fire box as will be hereinafter more fully described while pipes 24 and 25 respectively, provide a hot air draft.

The top or third floor rests upon a floor of masonry 26 and I-beams 27.

As shown in Fig. 3 vertical beams 28 and 29 support the frame work of the top floor, and a plurality of doors 30 are provided for closing the preliminary drying chamber 22 toward the outside. These doors 30 are each provided with two handles 31 and 32 respectively and the uppermost row of doors 30 shows observation openings closed by doors 33.

The gases and products of combustion are exhausted through a pipe 34 leading to a flue 35 in communication with a chimney indicated generally at 36.

Within the flue 35 a ventilator or damper 37 is provided, the construction of which is shown in detail in Fig. 9. This damper 37 rests with its rod 38 upon a pair of pulleys 39 over which cables 40 are guided, which are also guided over other pulleys 41 on the outer wall of the flue 35 in such a manner, that a pull on the left hand cable 40 will open and a pull on the right hand cable 40 will close the damper. The degree to which the damper is opened or closed will be indicated by a hand 42 upon the rod 38 which hand is moving over a scale or dial plate 43.

As shown in Fig. 6 the inner walls of the preliminary heating chamber 22 are composed of elements 44 arranged in staggered relation in the manner of roof tiles so that the wet charcoal gliding down along the outer walls of the body 21 will enter the spaces 45 and 46 between the outer walls of the drier and the walls of the preliminary heating chamber 22 and gradually slide downward on the outside of these elements 44.

Within the chamber inclined partition plates or walls 47, 48, 49 and 50 are arranged providing flues, 51, 52, 53 and 54 respectively, while the central flue 55 formed by the plates 48 and 49 will lead the exhaust gases and products of combustion through the flue 23 toward the chimney.

The floor of the top section of the drier is indicated at 56 and through the center thereof the upper part of a brick baffle wall 57 extends into the flue chamber 55. Upon a shoulder of this wall 57 rests the bottom plate or support 58 for the foot of the partition walls 47 and 50.

Thus the hot gases and flames from the fire-box entering the preliminary chamber 22 through flues 59 and 60 in the floor 56 will follow the path indicated by the arrows in Fig. 6 leading around the partition walls and finally into the flue 55.

The plates forming the partition walls 47, 48, 49 and 50 are interconnected as shown at 61 in Figs. 10 and 11.

Staple-bands 62, shown in detail in Fig. 12 are used to horizontally brace the plates and are for this purpose guided through the holes 63 in each of the plates with the edges of the single plates engaging recesses 64 and 65 formed in the edges of the staples or bands.

The inner ends of said bands meet in the center of the flue 55 and are united by suitable fastening means passed through holes 66 in the overlapping ends of the bands, while suitable pins or hooks or pins on the elements 44 engage holes 67 in the outer ends of said bands.

At the foot of the top section 10 doors 68 are provided adapted to be operated by handles 69 swinging over perforated segments 70 allowing a regulation of the width of the door opening.

The charcoal which has successively passed down in spaces 45 and 46 and has been preliminarily heated during its passage, is gradually fed through the door openings 68, eventually when clogging, by the intermittent opening and closure of these doors into chambers 71 and 72 of the second floor section of the drier, generally indicated by 73 in Figs. 2 and 7.

The outer wall of this section is preferably made of masonry 14. The lower ends of the hot air draft pipes 24 and 25 are connected with suitable sockets 75 and 76 leading to suitable hot air chambers.

Central, vertical posts 77 and 78 rest with their foot parts 79 and 80 upon pairwise arranged girders or I-beams 81 and 82 respectively supported by the pedestal 83 resting on the floor 84 forming the ceiling of the bottom section. This floor 84 supports also the foot parts of the beams 28 and 29. As shown in Fig. 2 nine door 85, are provided in the front walls of the second floor of the tower for the inspection of the fire box and for the regulation of the draft, and for cleaning purposes large doors 86, and 87 are provided, the latter in an iron plate 88 between the posts 77 and 78.

A bottom door 89 provided with a locking bolt 90 is provided for the removal of soot, dirt, etc.

The fire box of the drier, in which oil is used as fuel, is generally indicated at 91 and unto the same extends the lower part of the baffle wall 57. The oil is introduced at both sides of the drier through pipes 92 provided with suitable nozzles 93 and control valves 94.

The fire box is resting upon iron plates or platforms 95 and 95' carried by I-beams 96 and 97 respectively supported in the front and rear walls of the drier. The central parts of these parts are bent rectangularly downward as at 98 and 99 and rest with their foot parts or plates 100 and 101 upon the top of the girder pairs 81 and 82 respectively.

The plates 95 and 95' carry at their outer ends the masonry pillars 102 and 103, respectively.

The pillar 103 has an intermediary layer of asbestos 104 for a purpose later to be described.

The masonry of the fire box is constructed in the well-known manner from fire-bricks and includes a bottom part 105, and an arch 106, as well as baffle walls or deadmen 107, 108 and 109 in any desired and required number, and a nest of flues 110 near each of the end walls in communication with the flues leading from the fire box through flues 111 and 112 in the baffle walls 108 and 109.

Intermediate the nests of flues, on each side of the baffle wall 57 chambers are provided which each contain a plurality or battery of retorts 113 and 114 and 113' and 114'. The individual retorts are separated by flues 115 in communication with the flues of the fire box and closed at the top by a ceiling 116.

As shown in Figs. 4 and 13 these retorts 113 are zig-zag shaped in side view for a purpose later to be described.

The charcoal chambers 71 and 72 are arranged above the retort chambers and air pipes 117 are provided in these chambers as shown in Fig 7, two for each pair of retorts of a battery, which are supplied with air from a common supply pipe 118.

Between each pair of air pipes 117 a number of twyer-heaters 119 are provided and all of said pipes are surrounded by the charcoal entering the chambers 71 and 72 from the top floor of the drier.

Regulating valves 120 are provided in each of the air pipes 117, and steam is supplied to the heaters 119 through an inlet 121 and after passage through all the heaters, the steam is exhausted through an exhaust pipe 122.

The bottom of the chambers 71 and 72 is formed by plates 123 which are shown in detail in Fig. 20. These plates are each provided with four elongated openings 124 through the center of which the pipes 117 extend. As shown in the end view of the plate 123 in Fig. 20, one edge of each plate has a longitudinal groove 125, while at the bottom each plate has a pair of tenons 126 adapted to fit into the top of the retort below. The plates 123 are interlocked by the engagement of the flange 127 of one of the plates with the groove 125 of the next adjoining plate as best illustrated in Fig. 4, and the entire row of plates of one battery of retorts is held on the front and rear wall of the drier by angular plates 127 and 128 respectively. Between two of the tenons 126 a triangular ridge or cornice 129 is arranged, for the purpose of diverting the fire gases and flames in order to offer to the same a larger heating surface.

The charcoal from the chambers 71 and 72 falls through the openings 124 in the plates at both sides of the pipes 117 into the retorts 113.

These retorts are shown in Figs. 13 and 14 in side and in front view.

As shown in Fig. 14 each retort 113 is provided at its inner wall within two pairs of oppositely disposed shoulders 130 and 131 and 132 and 133.

Upon shoulders 130 and 131 the lower flange 134 of the socket 135 of an air drum or cylinder 136 is resting provided with a plurality of air holes 137.

Through these holes the air supplied through the pipe 117 under a certain pressure will act upon the charcoal during the passage of the same through the retort and according to necessity or desire, the large air drums 136 may be used if a quick passage of the charcoal along the zig-zag shaped walls 38 thereof is desired, or a smaller drum 139 of a construction shown in Fig. 19 may be used having a flanged socket 140 and air ducts 141, 142 and 143.

From the retorts 113 the charcoal under the action of the air blowing through the drums 136 and 139 enters the foot sockets 144 shown in detail in Figs. 15 and 16 in side and front view, and the cooling and cleaning retorts 145 shown in Figs. 17 and 18 partially in section in order to disclose their inner structure.

As shown in Fig. 17 in side view, in the interior the retorts 145 are each provided with a number of deflector plates 146 so that the dust and impurities carried along with the charcoal are blown out of the retorts through the small openings or slots 147 under the action of the air coming from the drums 136 or 139.

The pure charcoal as shown in Fig. 5 leaves the lower ends of the retorts 145 which are provided with sockets 148 having openings 149 at their lower ends, which are closed by doors 150 which are coupled by a common slide rod 151 adapted to be operated from a cable 152 fastened with its free end to the operating handle 153 pivotally secured to a bar 154 on an I-beam 155.

To the slide rod 151 the operating cables 156 for the closing slides 150 are secured which are also secured to suitable rods 157 and operating levers 158 to raise or lower weighted levers 159 at the ends of the doors 150, so that upon the operation of the handle 153 the slide rod 151 and the slides 150 are actuated for opening or closing the lower ends of the retorts 145.

To the cable 152 a second cable 160 is secured at a suitable distance from the handle 153, and the free end of this cable is secured to one arm of a bell-crank lever 161 pivoted in a yoke 162 secured to an I-beam 163.

To the second arm of the bell-crank lever 161 the free end of a cable 164 is secured which is fastened with its other lower end to a door 165 pivotally secured as at 166 to a weighted projection 167 of a hopper located underneath of the lower doors 150 of the retorts 145 and closing the mouth 169 of the hopper. One hopper 168 is provided for each battery of retorts.

A conveyer 170 of any well known construction forming a trough 171 is provided for receiving and carrying away the charcoal coming from the drier.

In order to cool the heated charcoal before it leaves the hopper, a system of pipes 172 is provided having a water inlet 173 and a water outlet pipe 174, so that constantly a stream of cold water from any desired source of water is passing through the system 172.

In operating my improved apparatus the wet charcoal is conveyed to the upper floor or preliminary drying chamber through the basket 11 into the hopper 12, and the charcoal flows or sinks gradually down along the outer slanting walls of the triangular body 21 into the chambers or spaces 45 and 46 in which it is subjected to the heat of the fire gases and flames guided around the baffle plates and into the chimney in the manner indicated by the arrows in Fig. 6.

The charcoal gliding downward along the elements 44 through the doors 68 into the chambers 71 and 72 is therein subjected to the action of the heat supplied to the twyers 119 and enters through the openings in the bottom plates 123 of these chambers to both sides of the air pipes 117 into the heating retorts 113, 113' and 114, and 114' respectively.

The pipes 117 also enter these retorts and carry at their lower ends perforated drums 136 or 139 through which the air under a certain pressure supplied through pipes 117 from any suitable source passes into the retorts and through their foot parts 114 into other retorts 145 provided in their interior with suitably constructed and arranged baffle plates 146 allowing a separation of the impurities and dust under the influence of the air supplied through the pipes 117 and drums 136 and 139, which leave the retorts 145 through the openings 147 to be collected at the bottom of the furnace.

The pure charcoal then leaves the retorts 145 through their lower doors 150 upon the operation of the same from a handle 153 and falls into a hopper 168 below such doors. All the doors are simultaneously operated from a single cable 152 secured at one end to said handle 153 to which is also connected a cable 160 for the operation of the bell-crank lever 161 which in turn controls the bottom door 165 of the hopper 168 so that upon the operation of the handle 153 in one direction all the sliding doors 150 are operated and the charcoal falls into the hopper below, while upon operation of the handle 153 in the other direction the door 165 of the hopper 168 will be opened and the charcoal will be dumped upon a movable trough shaped conveyer 170.

As the charcoal coming out of the retorts is still very hot it is subjected to the action of a cooling medium, preferably water, circulating through the system 172 at the bottom part of the hopper 168.

The draft can be suitably regulated by opening any one or a number of doors in the front wall of the fire-box and by the appropriate regulation of the damper 37 by means of the cord 40 the degree to which the damper is opened is made visible on the scale 43.

The fire box in which preferably crude oil is used as fuel has a well known construction including fire-arch, flue nest and baffle walls which do not form a part of the present invention.

Any number of driers may be placed side by side and between the walls of the single driers asbestos layers 104 are interposed in order to conserve the heat in one of the driers while its neighbor may not be working.

The steam for heating the twyers 119 may be supplied from any source, preferably generated within the drier itself.

The purpose of making the retorts 113 zig-zag shaped in side view, is to facilitate the passage of the charcoal through the same and to submit all parts of the charcoal to the action of the heat furnished by the flames playing between the single retorts and the cornice work on top of the retort chamber, so that a perfectly uniformly dried charcoal is obtained.

Two batteries each comprising a plurality of retorts are provided and one hopper for each of such battery of retorts opening into a common conveyer.

It will be understood that we have above described the preferred form of construction of our combined charcoal drier, cooler and cleaner and that many changes may be made in the minor details thereof without departing from the spirit and scope of our invention, but what we claim and desire to secure by Letters Patent of the United States is as follows—

1. An apparatus for treating charcoal of the character described comprising a tower, consisting of three superposed floors, a preliminary drying chamber on the upper floor, heating retorts and a fire box in the central floor, and cleaning, cooling and delivery means on the ground floor, means for regulating the draft, means for visibly indicating the degree of the draft regulation, means for supplying charcoal to said tower, and means for supplying fuel to the same.

2. An apparatus of the character described for treating charcoal comprising a three-story tower, a basket and hopper in said tower for supplying charcoal, a preliminary drying chamber on the upper floor of said tower, means for heating said chamber, a pair of heating chambers on top of the second floor of said chamber, means for heating the charcoal in said chambers, two batteries of heating retorts beneath said chambers, means for heating the outer walls of said retorts, means for supplying air under pressure to said retorts, cooling and cleaning retorts underneath said heating retorts on the ground floor of said tower, means for delivering the charcoal from said last named retorts, hoppers below said last named retorts, a conveyer beneath said hoppers, means for regulating the delivery of charcoal from said last named retort into said hopper, means for regulating the delivery of the charcoal from the hopper onto the conveyer, a fire box, means for supplying fuel to said fire box and means for distributing the heat through said tower and means for regulating the draft.

3. An apparatus for treating charcoal consisting of a tower, an upper floor in said tower, comprising a preliminary heating chamber, a basket and hopper for supplying charcoal to said chamber, a triangular body beneath said hopper, two roof-tile shaped walls forming said chamber providing a space outside of said chamber for gradually feeding the charcoal downward, means for supplying heat to said chamber, means for distributing the heat within said chamber, means for allowing the charcoal to pass from said space at the bottom thereof, means for allowing an inspection and cleaning of said chamber, and means for connecting the heat distributing means substantially as described.

4. An apparatus of the character described for treating charcoal consisting of a tower, an upper floor in said tower comprising side walls consisting of interlocked plates provided with handles, of an inner wall formed by fire-bricks arranged in staggered relation in the manner of roof-tiles for gradually feeding the charcoal, said walls forming an inner preliminary heating chamber and an outer space for the charcoal, means for feeding wet charcoal to said outer space, a plurality of substantially vertical plates within the heating chamber, means for connecting the said plates and said walls, and means for allowing a discharge of the charcoal at the bottom of said walls.

5. An apparatus of the character described for treating charcoal consisting of a tower, an upper floor in said tower, comprising a hopper a triangular body beneath said hopper having slanting outer walls for guiding the charcoal, said body forming a flue adapted to be connected with a chimney, walls formed by bricks arranged in staggered relation in the manner of roof-tiles providing a space for the reception and gradual passage of the charcoal from said hopper and slanting walls, doors at the lower ends of the outer tower walls controlling the discharge of the charcoal from said space, said walls forming an inner heating chamber, a plurality of perforated baffle plates within said chamber providing flues, staples passed through the perforations in said baffle plates for connecting the same, and a masonry baffle wall in the central flue, said central flue communicating with the flue in said triangular body substantially as described, and for the purpose set forth.

6. An apparatus of the character described for treating charcoal consisting of a tower, a central floor in said tower, comprising a pair of heating chambers below the ceiling of said floor adapted to receive the charcoal discharged from the upper floor, a pair of air pipes in each of said chambers, a twyer heater between each pair of said air pipes perforated bottom plates for said chambers through the perforations of which said air pipes pass, said bottom plates being grooved at one edge and flanged at the other for interengagement of two adjoining plates, a fire box, flues leading from said fire box to the floor above, a plurality of heating retorts, flues for guiding the flames around the outer upper and bottom walls of said retorts means for supplying air to said air pipes, and means for supplying steam to said twyers and exhausting the same therefrom.

7. An apparatus of the character described, for treating charcoal consisting of a tower, a central floor in said tower comprising a fire-box, means for supplying said fire-box with oil as fuel, baffle walls within said fire-box, a fire-arch and a nest of flues in said fire-box, a set of retort batteries on said floor, flues for leading the flames around said retorts and their head and foot parts, means for supplying a draft to said fire-box, means for supporting said fire-box, and means for allowing an inspection and cleaning of the same.

8. An apparatus of the character described, for treating charcoal, consisting of a tower, a central floor in said tower, batteries of retorts on said floor, each of said retorts having zig-zag shaped walls in side view, air drums within each of said retorts, air pipes leading into said drums and foot parts on said retorts, a fire-box a means for supplying fuel to said fire-box and means for guiding the heat from said fire-box around said retorts, their head and foot parts, and means for exhausting said heat and the fire gases toward the upper floor of said tower.

9. An apparatus of the character described for treating charcoal consisting of a tower, a central floor in said tower, two heating chambers on top of said floor, perforated bottom plates for said chambers, two batteries of retorts below each of said chambers, projections on the bottom plates of said chambers for engaging the head of said retorts, heating pipes passing through said chambers into said retorts, perforated air drums, supported in each of said retorts connected to said air pipes, the retort walls being zig-zag shaped, foot parts on said retorts, and cleaning retorts underneath said fore-named retorts and communicating thereto.

10. An apparatus of the character described for treating charcoal consisting of a tower, a central floor in said tower, a ceiling for said floor constituting the floor of the upper story of said tower, two heating chambers in said ceiling two flues passing through said ceiling adapted to communicate with a heating chamber on the floor above, a pair of air pipes passing through each of said chambers, a steam twyer within each chamber, a means for supplying air to said air pipes and a means for supplying steam to said twyers and exhausting it therefrom, a battery of heating charcoal retorts below each of said chambers, a perforated bottom plate for each of said chambers allowing a passage of said cooling pipes into said retorts, an air drum provided with air exhaust chambers secured to the lower end of each of said air pipes, and means for heating the retorts and their head and foot parts.

11. An apparatus of the character described for treating charcoal consisting of a tower, a central floor in said tower, a ceiling for said floor constituting the floor of the upper story of said tower, said walls for said floor, asbestos layers in said side walls for conserving the heat and preserving the walls, a fire-box, hot air chambers laterally disposed to said fire-box, hot air pipes leading from said fire-box to the floor above, a front and rear brick wall for said fire-box provided with inspection and cleaning openings, and doors for closing said openings.

12. An apparatus of the character described for treating charcoal consisting of a tower, a fire-box in said tower, baffle walls and nests of flues in said fire-box, a chimney, a flue for connecting said chimney, with said fire-box flues, a damper in said connecting flue, a rod for said damper, a pair of pulleys, supporting said rod, a pair of pulleys secured to the outer face of said connecting flue, means guided over said pulleys for operating said damper, and means for visibly indicating the degree of such operation.

13. An apparatus of the character described for treating charcoal consisting of a three story tower, a fire-box in the central story, baffle walls or deadmen, and a fire-arch in said fire-box, nests of flues in said box, a chimney, a flue for connecting said chimney with said fire-box flues, a damper plate in said connecting flue, a rod on said damper plate extending to the outside of said flue, a pair of pulleys supporting said rod, a pair of pulleys secured to the lower face of said connecting flue, a rope guided cross-wise over said pulleys and adapted to be operated to open and close said damper, a hand on said rod, and a scale over which said hand is guided for visibly indicating the degree of opening or closing said damper by the operation of said rope.

14. An apparatus of the character described for treating charcoal consisting of a tower comprising an upper, central and ground floor, a plurality of cleaning retorts on said ground floor, head parts for said retorts adapted to communicate with retorts on the floor above, doors at the lower end of said retorts, means for normally closing said doors, means for simultaneously operating the closing means for all of said doors, a hopper below the doors of said retorts, having a lower outlet, means for controlling the outlet of said hopper adapted to allow a discharge of the charcoal onto a conveyer, and means for cooling the charcoal in said hopper below its discharge therefrom.

15. An apparatus of the character described for treating charcoal, consisting of a tower, comprising an upper, central and ground floor, a plurality of cleaning retorts on said ground floor, head parts for said retorts adapted to communicate with heating retorts on the central floor, baffle plates on the inner walls of said cleaning retorts, means for discharging all impurities and dust from the charcoal before its discharge from said retorts, sliding doors for closing openings in the lower parts of said retorts, a common operating rod for all of said doors, an operating cable for actuating said rod, means for operating said cable, and means for discharging the charcoal leaving said retorts upon the operation of said rod into a conveyer.

16. An apparatus of the character described for treating charcoal consisting of a tower, comprising an upper floor containing a heating chamber to which the charcoal is supplied to be heated, a central floor comprising two chambers into which the heated charcoal is discharged from said upper floor, and means for supplying heat to said tower, a plurality of heating retorts on said central floor in communication with said chambers, air supply means and steam supply means, air drums within said retorts in connection with said air supply means, cleaning retorts on the ground floor in communication with said heating retorts and adapted to clean the charcoal submitted to the air exhausted from said air drums, discharge means for removing the charcoal from said cleaning retorts and collection hoppers to receive the charcoal from said cleaning retorts and for discharging the same into a conveyer and cooling means for cooling the charcoal previous to its discharge from said hoppers.

17. An apparatus of the character described for treating charcoal consisting of a tower comprising an upper heating chamber, a central floor containing heating chambers, a fire-box, a plurality of heating retorts, and a lower or ground floor containing a plurality of cleaning retorts and a means for cooling the charcoal, means for distributing the heat means for exhausting the fire gases, means for controlling the distribution of heat, means for supplying cooling air, means for distributing said cooling air for cleaning the charcoal, means for discharging the heated and cleaned charcoal, and additional means for cooling the charcoal before the discharge thereof.

18. An apparatus of the character described for treating charcoal consisting of a tower comprising an upper floor, a central floor, and a lower or ground floor, a plurality of heating retorts on said central floor, air supply pipes within said retorts, perforated air drums in said retorts adapted to be connected with said air supply pipes, means for supporting said drums within said pipes, cleaning retorts in said central chamber, baffle plates within said cleaning retorts against which the charcoal is thrown by the air coming from said air drums, means for discharging impurities and dust through said cleaning retorts, hoppers, means for discharging the charcoal from said cleaning drums onto said hoppers, means for controlling this discharge, a conveyer, and means for discharging the charcoal from said hoppers into said conveyer, and a cooling system in the lower end of said hopper for cooling the charcoal before its discharge.

19. An apparatus of the character described for treating charcoal consisting of a tower, comprising an upper floor, a central floor and a lower or ground floor, a plurality of cleaning retorts on said ground floor provided with lower discharge openings, a hopper open at the bottom, sliding doors for said discharge openings, a common operating rod for said sliding doors, a cable secured to said rod, an operating handle to which the free end of said cable is secured, a second cable secured to said first named cable at a distance from said handle, a bell crank lever to one arm of which said last named cable is secured, a door closing the lower end of said hopper and pivotally secured to a projection of said hopper adapted to be operated by said second cable upon the operation of said handle, means allowing an inspection of the interior of said hopper, a water cooling system in the lower enlarged part of said hopper and means for supplying and discharging water to and from said system, and a conveyer forming a trough adapted to receive and remove the heated, cleaned and cooled charcoal received from said hopper.

20. An apparatus of the character described, for treating charcoal consisting of a tower, comprising an upper, a central and a lower or ground floor, a base for said tower, side and end walls, asbestos layers interposed in the side walls for preserving the heat and protecting said walls against the next adjoining apparatus, I-beams for supporting the single floors, a fire-box on said central floor, means for supplying fuel to said fire box, means for distributing the heat for heating a supply of charcoal, supplied at the top floor of said tower, means for exhausting the fire gases, means for controlling said exhaust and for regulating the distribution of the heat, means for cleaning the charcoal during its downward passage in the tower, and means for cooling the charcoal before its discharge from the ground floor of said tower.

In testimony whereof we have affixed our signatures.

THOMAS SAROCKIN.
JOHN MAGIELDA.